July 7, 1959  R. F. DOOLING  2,893,795
SEALING RING
Filed Jan. 12, 1959

RUSSELL F. DOOLING
INVENTOR.

BY Hazard & Miller
ATTORNEYS

United States Patent Office 2,893,795
Patented July 7, 1959

2,893,795

SEALING RING

Russell F. Dooling, Los Angeles, Calif.

Application January 12, 1959, Serial No. 786,261

3 Claims. (Cl. 309—23)

This invention relates to improvements in sealing rings designed to effect seals against the leakage of fluids under pressure between relatively movable surfaces.

Explanatory of the present invention, a seal commonly used for this purpose is a so-called O-ring. This is a torus-shaped ring usually made of an elastomeric material such as rubber, either natural or synthetic.

When an O-ring is installed in a mechanism or structure in which it is to perform its sealing function, it is usually positioned in a ring groove and when relaxed, has a cross-sectional diameter somewhat greater than the depth of the ring groove. The ring groove usually has a width somewhat greater than the cross-sectional diameter of the O-ring when the O-ring is relaxed. In applied position, the O-ring is radially squeezed somewhat between the back of the ring groove and the opposed surface against which it is to form a seal and is deformed from its circular condition to a more or less ovate condition considered in cross-section. Under static conditions, if fluid pressure is applied to one side of the O-ring it is usually moved and deformed to fill one end of the ring groove, and thus effect a seal.

In mechanisms where the seal is to function as a dynamic seal and relative movement takes place between a part on which the O-ring is mounted in a ring groove and an opposed part, O-rings have not proven entirely satisfactory. The surface engaged by the periphery of the O-ring on moving in an axial direction relatively to the O-ring has the material of the O-ring tending to adhere to it and tending to travel with it. This adherence may be infinitesimal in amount before actual slippage between the O-ring and the moving surface commences. Usually, in mechanisms of this character the relative movement between which the ring is to effect a seal is of a reciprocatory type and on reversals of the direction of movement of one part relatively to the other there is a pronounced tendency of the rubber of the O-ring to "fold under" a small amount of the fluid at or near the leading point of engagement between the O-ring and the moving surface. This "folded under" portion of the fluid during each reciprocation may be very small in amount but with repeated reciprocations the fluid tends to be drawn between the O-ring and the surface relatively to which it moves resulting in leakage if reciprocation is continued over a considerable length of time.

It is an object of the present invention to provide an improved seal of this general character but which will overcome the above-mentioned objections to conventional O-rings. In accordance with the present invention, the ring is so shaped that the portion thereof which contacts the moving surface does not have a rounded leading edge as in the case of the O-ring which can trip or fold under fluid when the moving surface is reciprocated relatively thereto. In addition, the sealing surface is made relatively small in comparison to the cross-sectional dimensions of the ring so as to obtain a concentrated point of pressure between the ring and the moving surface and to avoid disengagement or displacement of the sealing surface of the ring from the moving surface.

Another object of the invention is to provide a sealing ring of relatively simple design which can be manufactured readily so that flash or other mechanical irregularities need not occur at or near the sealing surface of the ring which might detrimentally affect its sealing abilities.

With the foregoing and other objects in view, which will be made manifest in the following detailed description and specifically pointed out in the appended claims, reference is had to the accompanying drawings for an illustrative embodiment of the invention, wherein:

Figure 1:
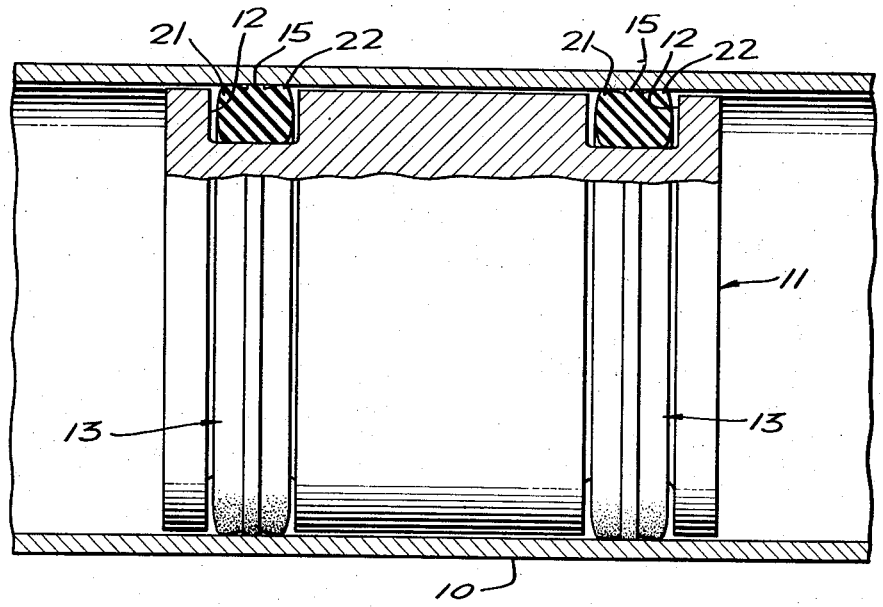
Figure 1 is a sectional view through a mechanical structure illustrating a typical application of the improved sealing ring.

Referring to the accompanying drawings wherein similar reference characters designate similar parts throughout, in Fig. 1 there is illustrated a cylinder 10 within which there is a reciprocable piston 11. It is desired to effect one or more seals between the exterior of the piston 11 and the interior of the cylinder 10.

In accordance with the present invention the piston 11 is provided with a ring groove 12 within which is positioned an endless annular sealing ring generally indicated at 13. This sealing ring is formed of an elastomeric material such as rubber, either natural or synthetic, and is of generally rectangular cross-section as distinguished from the conventional O-ring which has a generally circular cross-section when in relaxed condition.

The width of the ring 13 is slightly less than the width of the ring groove 12 to adequately allow for deformation and lateral expansion of the ring when subjected to radial compression.

Figure 4:
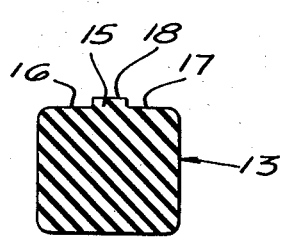
Fig. 4 is a sectional view through the ring while in its relaxed or unstressed condition.

The thickness of the ring 13 between its inner periphery and the major portion of its outer periphery is very slightly in excess of the distance between the back 14 of the ring groove and the interior of the cylinder 10. Intermediate the sides of the ring 13 and preferably near the center of its outer periphery there is an outwardly extending annular lip 15. As illustrated in Fig. 4 in the relaxed condition of the ring the surfaces 16 and 17 on opposite sides of the lip are parallel to the inner periphery or inside surface of the ring. The outer surface or contacting surface 18 of the lip is likewise parallel thereto and constitutes the primary sealing surface. When the ring is in applied position in its ring groove 12 and is radially compressed by the cylinder 10 the lip 15 is under considerable compression, being forced back within the general contour outline of the ring, thus forming grooves or depressions 19 and 20 on opposite sides of the lip.

Figure 2:
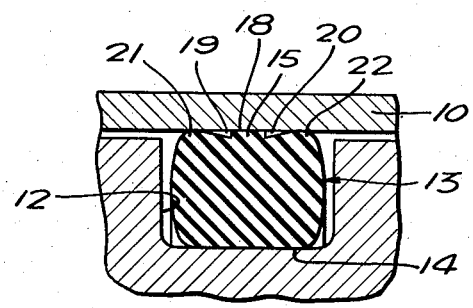
Fig. 2 is a partial view in vertical section on an enlarged scale of a portion of Fig. 1.
Figure 3:
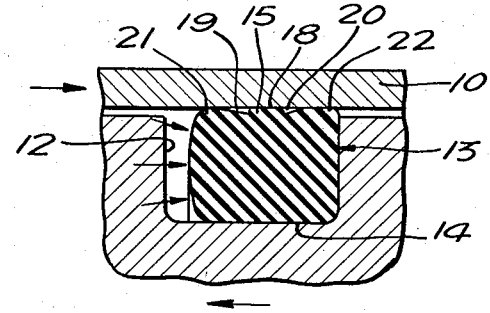
Fig. 3 is a view similar to Fig. 2, but illustrating the ring as being subjected to pressure while relative movement is taking place between the sealing ring and the part against which it seals.

The body of the ring may be laterally expanded somewhat within the ring groove as illustrated in Fig. 2, and in this condition the corners 21 and 22 preferably have a wiping engagement with the interior of the cylinder 10 but do not exert any great amount of pressure thereagainst. Most of the pressure between the sealing ring and the cylinder 10 occurs through the lip 15 and on surface 18. As the sides of the lip are preferably arranged in planes at right angles to surface 18 it will be appreciated that there is little opportunity for fluid to be folded under by this portion of greatest sealing engagement between the ring 13 and the cylinder 10. If relative movement takes place between cylinder 10 and piston 11 in the manner indicated by the arrows on Fig. 3, the ring may be crowded to one end of the ring groove and may be deformed somewhat in the manner illustrated. However, it will be found that with a ring thus constructed that even though relative reciprocation between the parts continues over a prolonged period of time, that leakage past the sealing ring either does not take place or only occurs in negligible amounts.

While I have illustrated the sealing ring as being an external ring externally mounted on a piston or the equivalent which reciprocates in a cylinder 10, it will be appreciated that the invention is equally applicable to an internally mounted sealing ring forming a seal around an internal reciprocating shaft. In the latter form of construction the sealing lip 15, instead of being arranged on the exterior periphery of the sealing ring, as shown, would be arranged on the internal periphery thereof and function in the same manner.

In the preferred form of construction the distance that the lip 15 protrudes beyond surfaces 16 and 17 is approximately one-tenth and preferably .08 of the radial thickness of the ring. A ring having such dimensions is conducive to being deformed into substantially the shape illustrated when the ring is in applied position.

Various changes may be made in the details of construction without departing from the spirit and scope of the invention as defined by the appended claims.

I claim:

1. In combination, first and second relatively movable members, the first member having an annular rectangular ring groove therein open toward the second, an elastomeric annular sealing member in said groove arranged loosely with respect to the sides of the groove but radially compressed between the members, said sealing member being of generally rectangular cross-section when relaxed and having an annular lip arranged intermediate its sides on that face of the ring disposed toward the second member, the sides of the sealing member being approximately equal in thickness to the distance between the back of the groove and the second member, and the lip being depressed into the body of the sealing ring forming grooves on both sides of the lip in the face of the sealing member disposed toward the second member.

2. A device as claimed in claim 1, wherein the sides of the lip are arranged in planes at right angles to the axis through the sealing member.

3. A device as claimed in claim 1, wherein the radial thickness of the lip is approximately one-tenth of the radial thickness of the sealing member.

References Cited in the file of this patent

UNITED STATES PATENTS

| | | |
|---|---|---|
| 2,438,153 | Dick | Mar. 23, 1948 |
| 2,462,596 | Bent | Feb. 22, 1949 |
| 2,473,284 | Knaggs | June 14, 1949 |